United States Patent Office 3,338,981
Patented Aug. 29, 1967

3,338,981
PRODUCING HALOGENATED OLEFINIC HYDROCARBONS FROM 1-ALKYNES AND PERHALOALKANES
Norbert F. Cywinski, Bartlesville, Okla., assignor to Phillips Petroleum Company, a corporation of Delaware
No Drawing. Filed Nov. 14, 1962, Ser. No. 237,726
1 Claim. (Cl. 260—654)

This invention relates to the production of a halogenated hydrocarbon. In one of its aspects, the invention relates to the production of an unsaturated or olefinic bond and halogen-containing product obtained by bringing together a 1-alkyne having 2–5 carbon atoms with at least one of carbon tetrachloride, hexahaloethane, etc., in the presence of a free-radical initiator comprising organic peroxides, metal alkyls, ultraviolet radiation and gamma radiation, in one embodiment also employing actinic or chemically active rays, such as ultraviolet, in conjunction with the free-radical initiators to increase the reaction rate and reduce the temperature and/or time requirement; ultraviolet, for example, assisting in initiating free-radical formation.

In another of its aspects, the invention relates to the preparation of 1,3,3,3-tetrachloropropene by condensation of carbon tetrachloride and acetylene, the carbon tetrachloride being added to the acetylene in the presence of an organic peroxide which decomposes under the reaction conditions to produce a free-radical initiator, the condensation resulting in the 1,3,3,3-tetrachloropropene.

It has now been found that an acetylene as herein described, i.e., a 1-alkyne having 2–5 carbon atoms to the molecule, can be condensed with saturated halohydrocarbon in the presence of a free-radical initiator to produce halogen-containing olefinic compounds in which the halogen is selected from the group consisting of chlorine, bromine, and iodine.

The products obtained can be used as monomers for polymerization to halogenated polymers in which usually greater control of polymer properties can be accomplished than by chlorination of a hydrocarbon polymer first formed. Also, the products of the invention can be used as soil fumigants. Further, 1,3,3,3-tetrachloropropene can be hydrogenated to produce a known nematocide, tetrachloropropane. Generally, halogenated olefins are of interest as insecticides and soil fumigants or components or starting materials for the same.

It is an object of this invention to produce a halogenated hydrocarbon. It is a further object of this invention to produce a halogen-containing olefin. It is a further object of this invention to provide method and means whereby to condense a halogenated hydrocarbon with a 1-alkyne. A further object of the invention is the provision of a catalytic agent or initiator with which to provide formation of free radicals whereby to condense a 1-alkyne with a halogenated hydrocarbon.

Other aspects, objects and the several advantages of this invention are apparent from a study of this disclosure and the appended claim to the invention.

According to the present invention, there is provided a method of preparing an unsaturated halogen-containing product which comprises bringing together a 1-alkyne having 2–5 carbon atoms with at least one of carbon tetrachloride, hexachloroethane, carbon tetrabromide, hexabromoethane, carbon tetraiodide, hexaiodoethane, or the like, in the presence of a free-radical initiator. Though the reaction is preferred now to be conducted at a pressure sufficient to maintain a liquid phase, it can be effected in the vapor phase at or near atmospheric pressure.

Also, according to the present invention, there are produced certain novel compounds herein-mentioned which are characterized by an unsaturated or olefinic bond and halogen content. These compounds have the following general formula:

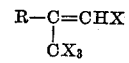

wherein R is selected from the group consisting of hydrogen, methyl-, ethyl-, n-propyl-, and isopropyl and X is a halogen.

The reaction can be effected either batchwise or in continuous manner using well-known types of apparatus and techniques of operation within the following now-preferred general ranges of operating conditions:

| | Broad | Preferred |
|---|---|---|
| Temperature, °C | 20–400 | 50–100. |
| Pressure, p.s.i.g | 0–400 | 50–200. |
| Contact time | 1 min.–100 hr. | 10 min.–10 hr. |
| Peroxide, mol ratio: | | |
| HC≡CH/peroxide | 100/1 to 1/1 | 50/1 to 5/1. |
| CCl₄/peroxide | 100/1 to 2/1 | 50/1 to 3/1. |

Suitable initiators for furnishing free radicals are those having half-lives in the range of 0.05–20 hours at reaction conditions.

Tobalsky and Mesrobian, "Organic Peroxides," page 469, Interscience Publishers, 1954, give half-lives of certain useful peroxide initiators. Additional information on organic peroxides is found in "Organic Peroxides," Davies, Butterworth's, 1961.

Peroxide initiators which are suitable in the practice of the present invention include:

Di-tert-butyl peroxide,
Tert-butyl hydroperoxide,
Benzoyl peroxide,
Acetyl peroxide,
Tert-butylbenzene hydroperoxide,
Dicumyl peroxide,
Hydroxyheptyl peroxide,
Cyclohexanone peroxide,
Tert-butyl peracetate,
Di-tert-butyl diperphthalate,
Tert-butyl perbenzoate,
Methyl ethyl ketone peroxide,
Menthane hydroperoxide,
Pinane hydroperoxide,
2,5-dimethylhexane-2,5-dihydroperoxide,
Cumene hydroperoxide, and the like.

When reaction temperatures in the range 200 to 400° C. are used, as with the heavier alkynes, i.e., those other than acetylene, and/or the bromine- or iodine-containing halogenated hydrocarbons, alkyls of the metals of Groups IIB and IVB—which include zinc, cadmium, mercury, germanium, tin and lead—can be used as free-radical initiators, and are preferred to organic peroxides. Metal alkyl initiators that are suitable in the practice of the present invention include:

Zinc dimethyl,
Cadmium diethyl,
Mercury dimethyl,
Germanium tetraethyl,
Tin tetramethyl,
Lead tetraethyl.

Metal alkyls having propyl, butyl, or amyl alkyl groups are not readily available, but can be used as initiators under appropriate conditions, as will be understood by those skilled in this art in possession of, and having studied, this disclosure.

A discussion of the chemical reactions of lead tetraethyl, including its use as a free-radical initiator, can be found on pages 306–318 of "Advances in Chemistry," No. 23, American Chemical Society, 1959. A general discussion on metal alkyls as free radicals can be found in "Free Radicals, an Introduction," Trotman-Dickenson, Wiley, 1959.

Free radical initiation can also be effected by ultraviolet light or by gamma radiation of the order of 10–1000 kev., which will permit use of temperatures in the range 20–50° C., that is to say, temperatures which are considerably lower than can be used with chemical initiators.

Use of lower reaction temperatures minimizes formation of less desirable, higher-boiling products which, nevertheless, of themselves, may be quite valuable. Thus, use of lower reaction temperatures minimizes the formation of chlorobenzene when benzoyl peroxide is used as a free-radical initiator. The chlorobenzene apparently is formed by a direct attack of carbon tetrachloride upon generation of phenyl radicals under the experimental conditions which have been used and are set forth herein.

Known solvents for the 1-alkyne or acetylene used can be employed. Such solvents are generally selected from among the ketones, e.g., acetone, methyl ethyl ketone, and the like. Such known solvents will serve to effect better contacting of the reactants and also add safety to the reaction. A solvent boiling close to the desired product should, of course, be avoided for reasons of facilitating recovery of product, where this is to be accomplished, before the product can be further used.

Although reactivity will decrease as molecular weight increases, as set forth herein, higher boiling homologues of acetylene with the triple bond in the terminal position can be used.

It has not been found possible to use chloroform in the place of carbon tetrachloride.

The reaction by which the present invention is effected appears to be a chain reaction. Accordingly, it is desirable to keep the reaction system as free of chain-terminating components such as mercaptans and quinones as is practical. High feed purity with respect to the undesirable chain-terminating compounds produces higher yields of products based on the initiator, as one skilled in the art, possessed of this disclosure and having studied the same, will appreciate.

*Example*

In a one-liter stirred autoclave, 655 ml. (1030 g., 6.69 mols) of carbon tetrachloride, 36 g. (0.149 mol) of benzoyl peroxide, and 15 g. (0.26 mol) of 1,2-propylene oxide were mixed, and flushed with nitrogen. Acetylene was added at such a rate that the partial pressure of acetylene was approximately 100 p.s.i.g. at a temperature of 90° C. The total pressure of acetylene, nitrogen, and carbon tetrachloride was 150–195 p.s.i.g. during the run. The reaction mixture was heated rapidly to 82° C., then heated slowly to 96° C. over a two-hour period. After cooling and removing the reaction mixture from the autoclave, the recovered product was flash-distilled under vacuum to remove heavy ends, then redistilled at atmospheric pressure through a Todd column using n-decane as a chaser. A fraction of distillate boiling at about 141° C. at atmospheric pressure was collected and analyzed using mass spectroscopy to identify individual components separated by gas chromatography, and was found to contain 14.2 g. of 1,3,3,3-tetrachloropropene and 25.6 g. of chlorobenzene.

It will be noted from the foregoing example that a scavenger, i.e., 1,2-propylene oxide, was used to react with hydrogen chloride generated. This scavenger did not participate in the reaction. Any other suitable hydrogen-halide scavenger can be used within the scope of this invention.

Although the reaction mechanism of the invention has not been fully established, the results obtained are consistent with a free-radical chain mechanism.

The reaction of carbon tetrachloride and acetylene, according to the invention, can be summarized as follows:

$$CCl_4 + HC \equiv CH \rightarrow CCl_3CH = CHCl$$

Reaction with hexachloroethane or with the bromo- and iodo-homologues of carbon tetrachloride and hexachloroethane takes place and can be similarly summarized for purposes of this disclosure, as one skilled in the art having studied the same will appreciate.

The 1-alkynes which are presently considered in this disclosure are acetylene and the alpha-acetylenes methyl-, ethyl-, n-propyl, and isopropyl acetylene. When 1-alkynes other than acetylene and halogen-containing hydrocarbons other than carbon tetrachloride are used, the following illustrative compounds are formed:

| 1-Alkyne | Halogen-Containing Hydrocarbon | Compound Formed |
|---|---|---|
| $CH_3-C\equiv CH$ | $CBr_4$ | $CH_3-C=CHBr$ <br> $\quad\quad\;\;\mid$ <br> $\quad\quad\;\;CBr_3$ |
| $C_2H_5-C\equiv CH$ | $CI_4$ | $C_2H_5-C=CHI$ <br> $\quad\quad\;\;\;\mid$ <br> $\quad\quad\;\;\;CI_3$ |
| $nC_3H_7-C\equiv CH$ | $C_2Cl_6$ | $nC_3H_7-C=CHCl$ <br> $\quad\quad\quad\;\;\mid$ <br> $\quad\quad\quad\;\;C_2Cl_5$ |
| $iC_3H_7-C\equiv CH$ | $C_2Br_6$ | $iC_3H_7-C=CHBr$ <br> $\quad\quad\quad\;\;\mid$ <br> $\quad\quad\quad\;\;C_2Br_5$ |

As acetylene is explosive under some conditions, concentration, temperature, pressure and the reactor configuration should be controlled to keep away from explosive conditions or other conditions of safety observed.

Within the range of pressures and temperatures and other conditions given herein, there is now preferably employed a pressure sufficient to maintain substantially a liquid phase in the reaction zone.

It is within the scope of the present invention to have one or more of the reactants or initiators present to form a reaction mass from which individual products, as may be desired, can be recovered, as where it may be more economical to use a mixture of acetylenes obtained in a process for the feed to the operation of the invention.

Reasonable variation and modification are possible within the scope of the foregoing disclosure and the appended claim to the invention, the essence of which is that 1-alkyne, as described, has been found to be condensible with a halogenated hydrocarbon, also as herein described, in the presence of a free-radical initiator, also as herein described, to produce olefin bond containing halogenated hydrocarbons.

I claim:

The method of preparing 1,3,3,3-tetrachloropropene which comprises reacting acetylene and carbon tetrachloride in the presence of a free-radical initiator at a pressure of about 150 to 195 p.s.i.g. at a temperature in the range of about 82 to 96° C. and in the presence of a 1,2-propylene oxide hydrogen halide scavenger.

References Cited

UNITED STATES PATENTS

| | | | |
|---|---|---|---|
| 2,401,099 | 5/1946 | Peterson et al. | 260—654 |
| 2,468,208 | 4/1949 | Kharasch | 260—658 |
| 2,551,639 | 5/1951 | Feasley et al. | 260—654 |

(Other references on following page)

OTHER REFERENCES

Adams et al.: "Organic Reactions," vol. 13, pp. 107–108, 128, John Wiley (London, 1963).

Henne et al.: "J. Amer. Chem. Soc.," vol. 72, page 3577 (1950).

Kharasch et al.: J. Org. Chem., 15, pp. 966–72 (1950).

Raphael: "Acetylenic Compounds in Organic Synthesis," Academic Press Inc., New York, N.Y. (1955), pp. 43, 45, and 55.

Waters: "Vistas in Free-Radical Chemistry," Pergamon Press Ltd. (1959), pages 50 and 51.

LEON ZITVER, *Primary Examiner.*

K. V. ROCKEY, T. G. DILLAHUNTY,
*Assistant Examiners.*